United States Patent

Turnquist

[15] 3,643,744
[45] Feb. 22, 1972

[54] GARDENING TOOL

[72] Inventor: Gunnard Turnquist, 230 Alice St., Bloomfield Hills, Mich. 48013

[22] Filed: May 15, 1969

[21] Appl. No.: 824,825

[52] U.S. Cl. .............................................. 172/372, 172/762
[51] Int. Cl. ......................................................... A01b 15/00
[58] Field of Search ................. 172/379, 380, 381, 372, 373, 172/374, 371, 720, 732, 770, 762, 763

[56] References Cited

UNITED STATES PATENTS

| 390,479 | 10/1888 | Johnson | 172/762 |
| 1,905,016 | 4/1933 | Traphagen | 172/762 |
| 221,053 | 10/1879 | Graves | 172/762 |
| 493,071 | 3/1893 | Crane | 172/762 |
| 2,169,557 | 8/1939 | Curtiss | 172/372 |
| 2,240,705 | 5/1941 | Klopfenstein | 172/372 |
| 2,251,048 | 7/1941 | Garland | 172/372 |

FOREIGN PATENTS OR APPLICATIONS

| 577,080 | 5/1933 | Germany | 172/380 |

Primary Examiner—Robert E. Pulfrey
Assistant Examiner—R. T. Rader
Attorney—Gerald R. Hershberger

[57] ABSTRACT

This invention is an improved garden hoe having a generally triangular one-piece flat sheet steel hoeing blade. The blade is attached detachably to the hoe handle by means of step bolts having male quadrilateral surfaces which engage centrally spaced female quadrilateral opening in the blade to prevent turning of the step bolts in the blade. Nuts are provided to secure step bolts, the blade, and hoe handle together as an assembly.

1 Claims, 5 Drawing Figures

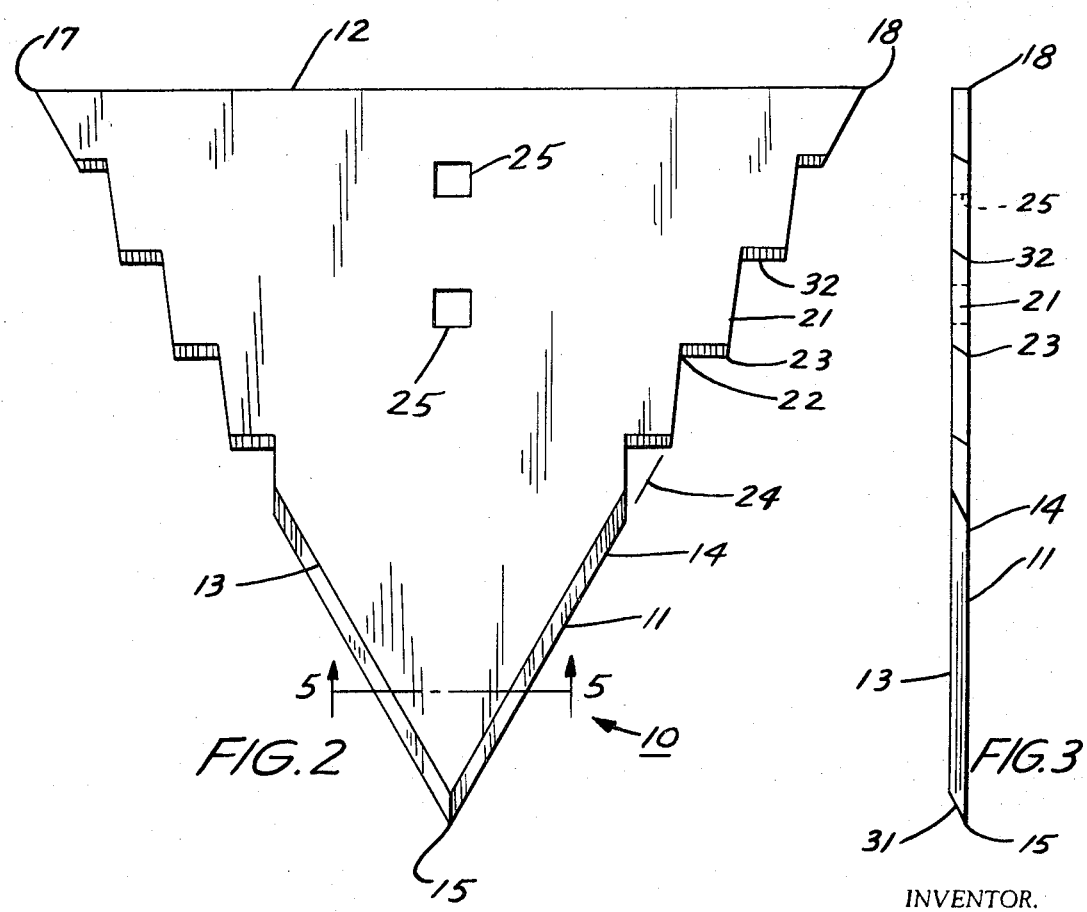
INVENTOR.
GUNNARD TURNQUIST
BY
Gerald R Hershberger
ATTORNEY

GARDENING TOOL

This invention relates to gardening implements, and more particularly to an improved garden hoe.

There are, of course, many types and forms of individual manual garden tools which have been used and are being used for the purpose of tilling the soil, however, past devices have been complicated and expensive to manufacture, comparatively inefficient to use, and difficult to maintain in good working order. The inventor has found that his device has been particularly helpful to women gardeners, as it is very efficient in removing stubborn weeds, breaking up the soil around plants, requiring a minimum of effort on the part of the user, due to its improved soil tilling structure.

It is therefore an object of this my invention, to provide a garden hoe structurally composed to be inexpensively manufactured, and efficient and easy to use for tilling the soil.

It is a further object of this my invention, to provide a garden hoe blade having an efficient soil-tilling configuration which can be inexpensively produced and manufactured in large quantities from a blanking die.

It is another object of this my invention, to provide a garden hoe blade comprised of a unique flat sheet steel construction which may be readily removed from the hoe handle for maintenance and sharpening.

Other and further objects of the invention will become apparent from the following specifications and drawing, and more particularly as set forth in the claims.

In the drawings:

FIG. 1 is a side elevational view of the device showing the structure and usage thereof;

FIG. 2 is a front elevational view of the hoe blade showing the detail outline and configuration thereof;

FIG. 3 is a side elevational view of the hoe blade.

FIG. 4 is a sectional view taken along lines 4—4 of FIG. 1.

FIG. 5 is a sectional view taken along lines 5—5 of FIG. 2.

Referring now to the drawing, particularly FIGS. 2 and 3, device is denoted generally by the numeral 10, and shown as including a generally triangularly outlined blade member 11, such as in the general outline of an isosceles triangle and preferably in the outline of an equilateral triangle.

Said blade member is preferably constructed of 0.087-gage SAE 1040 sheet steel, the sides of the triangle being 6 inches long, and the triangle being defined further by a top straight edge 12, a front edge 13 and a rear edge 14 terminating at a soil-tilling vertex or point 15. A primary soil tilling portion 16, extends upwardly from said point substantially one-third of the distance to the forward corner 17 and the rearward corner 18 of said blade. The remainder portion 19 of said sides of said blade are provided with substantially vertical cutting edges 21, terminating at inward vertexes 22, and outward vertexes 23, said outward vertexes lying even with or inside said sides and outline 24 of said triangular blade to facilitate manufacture from a blank without material waste.

Referring to FIGS. 1 and 4:

A plurality of quadrilaterally sided spaced opening 25 are punched in said blade when said blade is blanked out, said openings being vertically aligned centrally between said corners to provide fastening openings for engaging the quadrilateral faces 26 of step bolts 27.

Said step bolts extend forwardly through said blade and through holes 28 in hoe handle extension, 29, and nuts 30 secure said hoe handle extension said blade and said bolts securely together as readily detachable blade and hoe handle assembly 33. The blade 11 further includes a back slope 31 on said sides and said horizontal cutting edges to provide sharp edges 32 for cutting weeds and the like.

It is also understood that minor variation from the forms of the invention disclosed herein may be made without departure from the spirit and scope of my invention, and that the specification and drawing are to be considered as merely illustrative rather than limiting.

Having thus fully described my invention, I claim:

1. In an improved soil working and weed-cutting apparatus including a hoe handle having a goosenecked extension portion having vertically aligned cutting blade mounting openings disposed therein, and a plurality of step bolts and nuts, said step bolts having generally quadrilaterally outlined male fastening surfaces, the combination of, a one-piece flat blade member operable to be blanked from substantially 0.087-thousandths gage SAE 1040 sheet steel generally in the outline of a triangle to save stock, said member having a substantially straight top edge, and a substantially straight rear edge, and a substantially straight front edge, said front edge and said rear edge terminating at a sharp soil-tilling point, and said top edge and said front edge and said rear edge terminating at a front upper corner and a rear upper corner respectively;

a primary soil-tilling portion having two back-sloped straight cutting edges, one of which occupies substantially ⅓ of the length of said front edge beginning at said point;

a weed-cutting portion located on said front edge and said rear edge including a plurality of back-sloped cutting teeth blanked from within the area defined by the outline of said triangle, said weed-cutting teeth substantially occupying the remaining two-thirds portion of said front edge and said rear edge from said straight cutting edge to each of said corners, said blade member including a plurality of quadrilaterally sided female openings spaced apart and aligned generally centrally and vertically between said front upper corner and said rear upper corner adjacent said top edge, with said blade member mounted to said hoe handle goosenecked extension with said cutting edges of said blade member facing said hoe handle and said step bolts extending firstly through said blade member and secondly through said hoe handle extension cutting blade mounting openings normal to said blade member, with the male quadrilateral surfaces of said step bolts engaging said female quadrilateral blade openings, said nuts securely assembling said blade member, said step bolts and said hoe handle together in readily detachable relationship to each other.

* * * * *